June 22, 1926.

L. BRANČ

EGG HOLDER

Filed Nov. 12, 1925

1,589,935

Inventor:
Ladislav Branč

Patented June 22, 1926.

1,589,935

UNITED STATES PATENT OFFICE.

LADISLAV BRANČ, OF BRNO, CZECHOSLOVAKIA.

EGG HOLDER.

Application filed November 12, 1925. Serial No. 68,697.

This invention relates to a device for use in the packing of eggs for transport and storage, and consists in the provision of an egg holder composed of two sets of rectangular frames arranged at right angles to each other and supporting a plurality of egg-cup-shaped coil springs as well as spring bands whereby the eggs can be retained in the spring coils and protected from shocks and from contact with one another.

Figure 1:
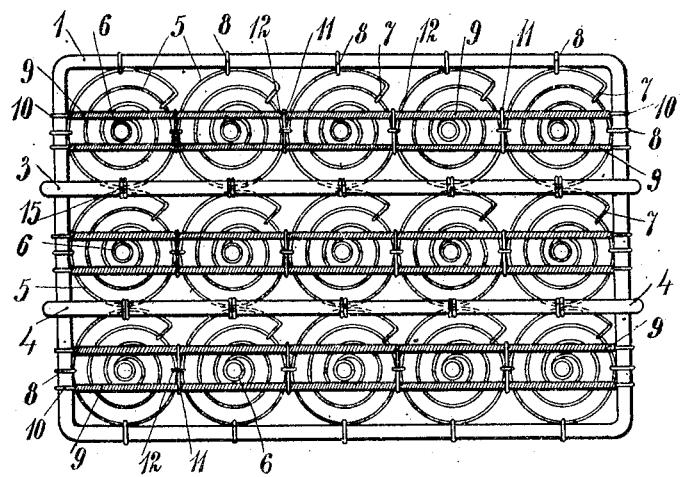
Figure 2:
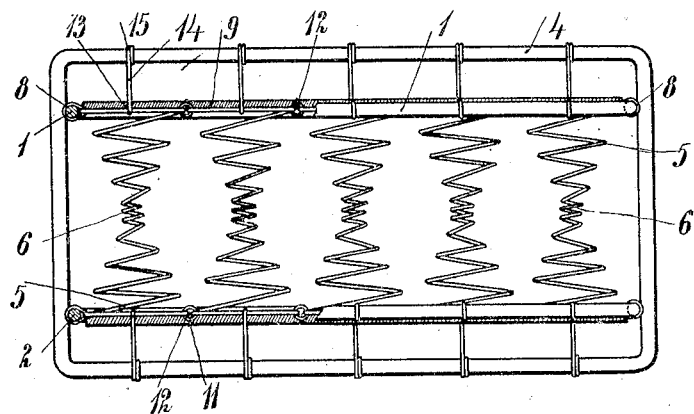

Fig. 1 of the accompanying drawings represents a side view of the device in its preferred form of construction, and Fig. 2, a plan view of the same, partly in section.

Two vertical, rectangular frames 1 and 2 are embraced by two horizontal frames 3 and 4, the two sets of frames being connected so as to form a rigid structure. The frames 1 and 2 are spaced from each other and from the side members of the frames 3 and 4, and the latter divide the frame space into three equal horizontal sections in each of which a row of coil springs 6 is arranged. Each spring 6 has a contracted middle portion and flares out conically towards both ends so as to form egg-cup-shaped structures 5 in which the eggs can be supported. To hold the eggs in position in the cups, two spaced spring bands 9, connected at 10 to the frames 1 and 2, are stretched across each row of cups. These spring bands are pulled aside to allow the eggs to be slipped into the cups 5 and will then retain the eggs in position.

The ends 7 of the coiled wire are turned back and connected to the next coil, as shown in Fig. 1. Wire loops 12 connect adjacent spring coils in the same row together, and loops 11 connect the loops 12 with the spring bands 9. The end coils are connected by loops 8 to the frames 1 and 2. Braces 14 are connected at 15 to the frame members 3 and 4 and at 13 to two adjacent coil springs of different rows. Thus the eggs will be held securely but resiliently in position and protected from shocks as well as from contact with one another. Moreover, the air will have free access to the entire egg surface. The holder is arranged so as to support the eggs in horizontal position and can easily be turned over together with its contents.

For transport, the holders are packed in boxes, either one holder in each box or several together. For greater security, several boxes, each containing a single holder, may be packed into one large box.

I claim:

1. An egg holder comprising two sets of rectangular frames arranged at right angles to each other, one set of frames being embraced by the other set, egg-cup-shaped coil springs supported by said frames within the confines thereof, and spring bands stretched across the mouths of the cups for holding eggs in the latter.

2. An egg holder as claimed in claim 1 in which each coil spring has a contracted middle portion and conically flaring end portions so that it can hold an egg at each end.

LADISLAV BRANČ.